SOUTHWORTH & HITCHCOCK.
Rice Huller.

No. 6,851.

2 Sheets—Sheet 1.

Patented Nov. 6, 1849.

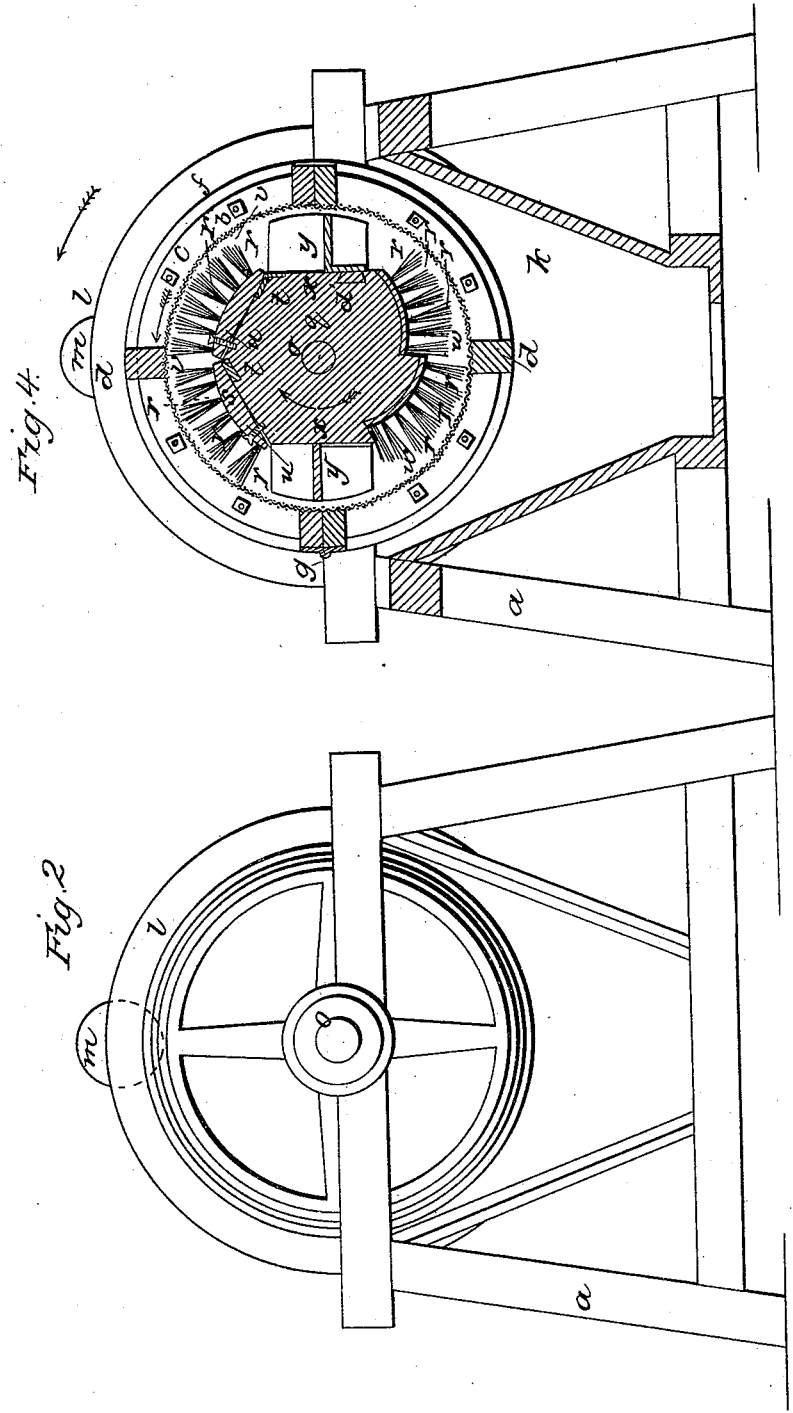

UNITED STATES PATENT OFFICE.

D. H. SOUTHWORTH AND JAS. R. HITCHCOCK, OF NEW YORK, N. Y.

RICE-HULLER.

Specification of Letters Patent No. 6,851, dated November 6, 1849.

*To all whom it may concern:*

Be it known that we, D. H. SOUTHWORTH and JAMES R. HITCHCOCK, of the city, county, and State of New York, have invented new and useful Improvements in Machinery for Cleaning and Polishing Rice and other Grains, and that the following is a full, clear, and exact description of the principle or character which distinguishes them from all other things before known and of the manner of making, constructing, and using the same, reference being had to the accompanying drawings, making part of this specification, in which—

Figure 1:
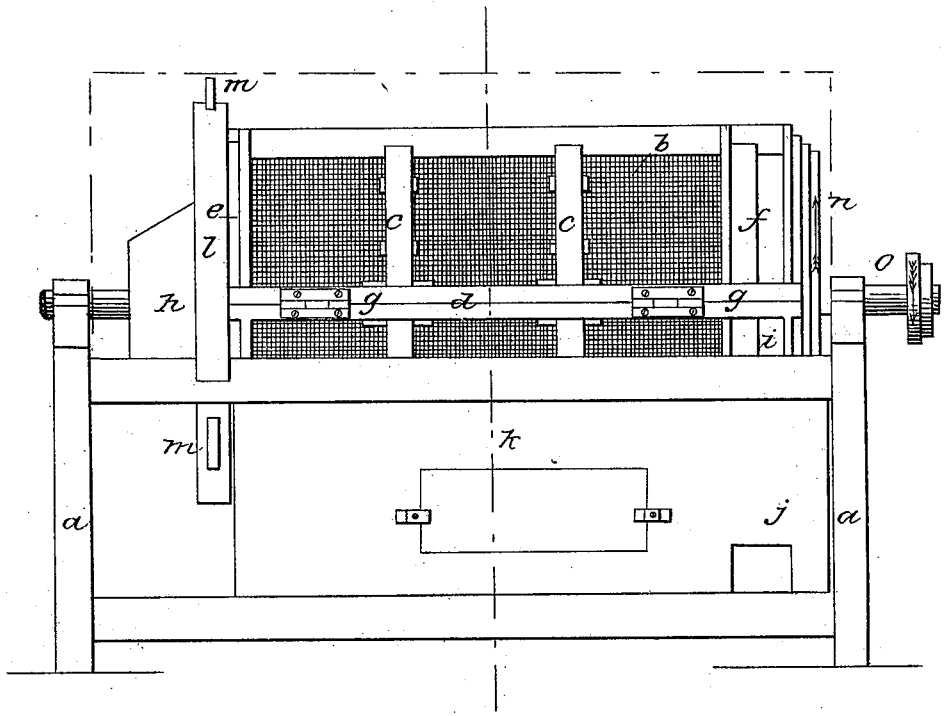
Figure 3:
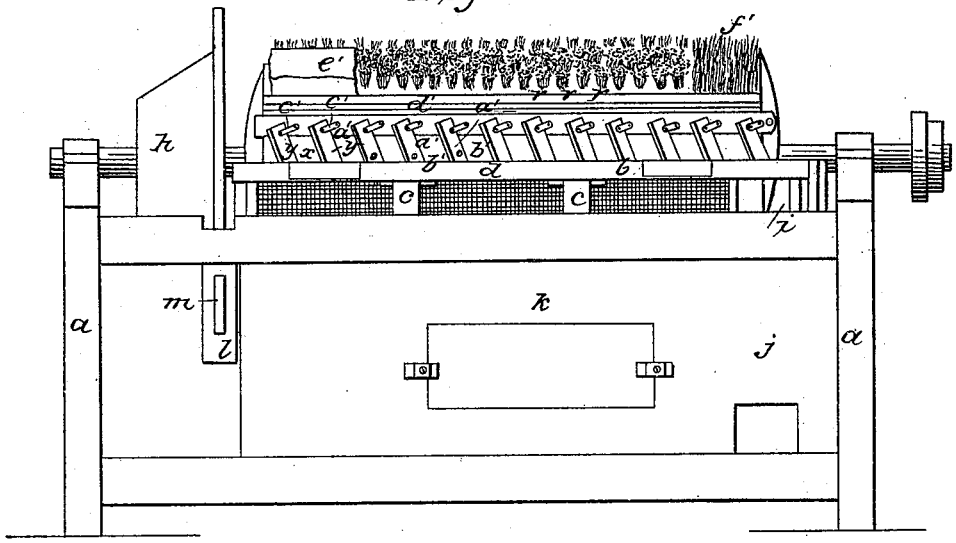

Figure 1 is a side elevation of the machine; Fig. 2, an end elevation; Fig. 3, a longitudinal elevation with the outer casing removed; Fig. 4, a cross vertical section.

The same letters indicate like parts in all the figures.

In our improved machine the outer case, which is a cylinder lined inside with wire gauze, rotates in one direction and the inside rubber in the opposite direction, the rice after having been hulled being fed into the machine and between the rubber and outer cylinder from a hopper through the end of the outer case which is in the form of a hollow frustum of a cone, with the smaller end outward. The rubber consists of rows of brushes which are so made as, in their rotation, nearly to touch the wire gauze cylinder, the space between the two being as near as possible one fourth less than the average diameter of the grains of rice. The outer periphery of the brushes is slightly eccentric or concentric with a portion along the forward edge cut off to form an inclination so as to leave sufficient space between the ends of the brushes and the wire gauze cylinder for the free entrance of the rice between the brushes and wire gauze cylinder. The rice is carried through the machine by means of what we denominate inclined feeders that is one or more rows of paddles interposed between the rows of brushes and projecting radially from the core or stock of the rubber, and with their faces inclined to the line of the axis of the feeder so as to act on the grain like the threads of a screw, or like Oliver Evans' conveyer used in mills for conducting meal through a trough. At the forward end, that is, the feeding in end, some or all of the rows of brushes are preceded by a plate of india rubber the outer periphery of which is of little less diameter than the concentric part of the brushes, their diameter being just so much less than the inner periphery of the wire gauze as to make a very slight pressure on the rice as it passes between them, the object of this being to remove any portion of the hull that may remain on the grains; but if these be made of sufficient length the rice may be hulled and polished by the same machine, and at the rear end, that is, the delivery end, instead of extending the rows of brushes to the end of the rubber, they are cut off and strips of lamb's wool on the skin are attached to the core of the rubber so that the fibers of the wool shall in the rotation rub and make pressure on the grains of rice to give the last polish of the surface. The plates forming the feeder are each jointed to the core or stock of the rubber, and also to a bar that slides longitudinally in a groove so that by moving this bar the inclination of the feeders can be increased or decreased to regulate the passage of the grain through the machine to regulate the amount of cleaning and polishing some qualities of rice requiring more and some less rubbing. And as it is important that the relative diameter of the wire gauze cylinder and the brushes or rubbers should be well adjusted the brushes are attached to strips or blocks connected with the core or stock by means of hinges and set screws or by wedges to admit of adjustment.

In the accompanying drawings ($a$) represents a frame properly adapted to the purpose but which can be altered at pleasure, and ($b$) a wire gauze cylinder the meshes of which are to be large enough to permit the free escape of all the impurities but not the grains of rice. This is properly secured to a frame consisting of hoops ($c$) and longitudinal bars ($d$), and heads ($e$, $f$) so as to constitute a hollow cylinder, the frame being made in two parts divided by a plane passing through the axis and hinged together on one side as at ($g$) and connected together at the other by screws or other means to admit of opening the case to give access to the inside. The head ($e$) at the feeding in end is a ring to the inner periphery of which is secured the base of a hollow frustum of a cone ($h$) into which the grain is fed from a hopper in any desired manner. And the other head ($f$) extends down to and turns on the shaft of the rubber to be described. The wire gauze cylinder does not however extend to this head but only to the ring next to it, thus leaving a space (*i*) between the two of sufficient capacity for the discharge of the polished rice into a delivery case (*j*) from whence it can be removed at pleasure, the bran and other impurities that pass through the meshes of the wire gauze cylinder being deposited in the part (*k*) of this case.

The outer periphery of the head (*e*) is fitted to and turns in a collar (*l*) provided with friction rollers (*m*), and the rear head (*f*) is provided with a pulley (*n*) to receive a belt from some first mover to rotate it in the direction indicated by the arrow.

The shaft (*o*) of the rubber passes entirely through the cylinder and has its bearings in the ends of the frame, and is provided with a pulley (*p*) by which it is rotated by a belt from some first mover in a direction the reverse of the cylinder as indicated by the arrows, although the two can be rotated in the same direction, one faster than the other, but this will be found inferior to running them in opposite directions. On the shaft there is a stock (*q*) which is made of wood or other material, and of the length of the wire gauze cylinder; and to the periphery of this stock is secured in a longitudinal direction rows of brushes (*r*), the bristles being inserted in blocks of wood (*s*) with one edge connected by hinges (*t*) with the stock and the other edge by screws (*u*) so that by the insertion of wedges under the blocks the diameter of the brushes can be adjusted to the wire gauze cylinder to regulate the distance between them, as this is highly important to the successful operation of the machine, particularly as the ends of the bristles wear. The forward edge of these brushes, that is, the edge toward the direction of the rotation, should be cut off in a bevel as at (*v*), or the entire periphery of each segment of brushes should be eccentric as at (*w*) that the rice may freely enter between the brushes and the wire gauze cylinder.

Two segments (*x*, *x*) of the stock are not covered with brushes, and to these are fitted wings or paddles (*y*) formed of sheet metal (or other substance) and projecting radially from the surface of the stock, and with their planes inclined to the axis, and with their outer periphery running nearly in contact with the wire gauze cylinder. As the brushes or rubbers rotate it will be obvious that these inclined wings, which are denominated feeders will catch the rice delivered by one set of brushes and push it toward the delivery end of the machine before it is acted upon by the next set of brushes, and so on until it is delivered at the end in a polished state.

For the purpose of regulating the passage of the grain through the machine, as indicated above, the wings or paddles are made with a flanch (*a'*) at right angles to their plane, and this is secured to the stock by a screw (*b'*) that passes through the middle thereof, and one end of each of these is connected by a joint link (*c'*) with a longitudinal bar (*d'*) that slides in a groove in the stock, so that by moving this bar toward one end or the other of the stock the inclination of the wings will be increased or decreased and thus regulate the passage of the rice through the machine, for some kinds require more rubbing than others.

The brushes, or some of them, do not extend the whole length of the stock. At the forward or feeding in end blocks of india rubber (*e'*) of the width of the brushes are secured to the stock with their outer periphery corresponding in form with the periphery of the brushes but of little less diameter for the purpose of removing small portions of hull which sometimes adhere to the grains after they have passed through the hulling machine preparatory to the cleaning and polishing operation. And by making these sections of india rubber of greater length than represented in the drawings, say double the length, the rice may be hulled in the same machine, although it is preferable to hull it in a separate machine.

At the delivery end the sections not covered with brushes are provided with lamb's wool (*f'*) prepared on the hide for the purpose of securing them into the stock. The fibers from their yielding quality should project beyond the brushes so as to make a slight pressure on the rice when passing through that part of the machine, for the purpose of giving the last polish to the surface of the rice. Instead of lamb's wool other fibrous substances may be substituted but lamb's wool has been essayed with the best results.

The upper part of the machine should be covered with a hood represented by red lines to prevent the escape of dust and other impurities into the room. Instead of bristles for the brushes finely split whale bone, or other substances may be substituted.

The number of rows of brushes and feeders or conveyers may be increased or diminished without changing the principle of our invention. Instead of making the surface of the brushes with a bevel or eccentric to permit the rice to enter between the brushes and the wire gauze cylinder the stock may be made with a solid inclined plane along the forward edge of the rows of brushes, but it will be found to be an imperfect modification of the principle of this part of our invention.

The brush blocks instead of being hinged to the stock at one edge may be secured entirely by means of screws, with wedges under the blocks so that by loosening the screws and driving in the wedges the diameter of the brushes can be adjusted. Other means of adjustment can be substituted without changing the principle of this part of the invention.

It will be obvious from the foregoing that parts of our invention may be used to advantage without others, as for instance, the adjustment of the brushes may be dispensed with by making the brushes of the required diameter, but so soon as they are worn the machine will not operate well, and so with the adjustment of the feeders or conveyers, for if properly made they will operate without being made adjustable, but the machine will not be so well adjusted to the varieties of rice to be cleaned and polished. And in fact the conveyers may be dispensed with altogether by arranging the rows of brushes on the stock in the line of a helix, but without the conveyers it will be found that the machine in its operations will be far inferior.

What we claim as our invention and desire to secure by Letters Patent is—

1. The employment of rows of brushes on a rotating stock, in combination with a surrounding wire gauze cylinder, when the said rows of brushes or rubbers are made with their forward edges beveled, or with the equivalents thereof, substantially as described, whereby the entrance of the rice or other grains between the brushes and the surrounding cylinder is insured, as described.

2. The rows of inclined feeders or conductors in combination with and interposed between the rows of brushes or rubbers, substantially as described, for the purpose of conveying the rice or other grain through the machine, as described; and this is claimed in contradistinction to inclined feeders or conveyers used at the end of the brushes.

3. The rubbers made of india rubber at the feeding in end of the machine, in combination with the brushes, substantially as described, for the purpose of hulling the grain preparatory to the operation of the brushes.

4. The polishers made of lamb's wool or other equivalent substance at the delivery end of the machine, in combination with the brushes, substantially as described for the purpose of polishing grain preparatory to its delivery, as described.

5. Connecting the brushes with the stock by adjustable means, substantially as described, for the purpose of adjusting the periphery of the brushes to the wire gauze cylinder, as described.

6. And finally, making the inclination of the face of the feeders or conveyers adjustable relatively to the axis, substantially as described, for the purpose of regulating the passage of the grain through the machine, substantially as described.

D. H. SOUTHWORTH.
JAMES R. HITCHCOCK.

Witnesses:
A. P. Browne,
C. W. M. Keller.